United States Patent
Finodeyev

(10) Patent No.: US 10,309,574 B2
(45) Date of Patent: Jun. 4, 2019

(54) SYSTEMS AND METHODS FOR LEAK DETECTION AND SEALING

(71) Applicant: HYPERLOOP TECHNOLOGIES, INC., Los Angeles, CA (US)

(72) Inventor: Filip Finodeyev, Laguna Niguel, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 135 days.

(21) Appl. No.: 15/471,522

(22) Filed: Mar. 28, 2017

(65) Prior Publication Data

US 2017/0276284 A1 Sep. 28, 2017

Related U.S. Application Data

(60) Provisional application No. 62/314,077, filed on Mar. 28, 2016.

(51) Int. Cl.
| | |
|---|---|
| *F16L 55/16* | (2006.01) |
| *F16L 55/00* | (2006.01) |
| *F16L 55/168* | (2006.01) |
| *G01M 3/04* | (2006.01) |
| *G05D 1/00* | (2006.01) |

(Continued)

(52) U.S. Cl.
CPC ........ *F16L 55/1683* (2013.01); *B64C 39/024* (2013.01); *B64D 1/12* (2013.01); *G01M 3/04* (2013.01); *G05D 1/0011* (2013.01); *G05D 1/0094* (2013.01); *B64C 2201/024* (2013.01)

(58) Field of Classification Search
CPC ..... F16L 55/1683; F17D 5/02; G01M 3/2815; G01M 3/2807

USPC ................ 138/104, 99, 97; 73/49.1, 40.5 R; 702/51

See application file for complete search history.

(56) References Cited

U.S. PATENT DOCUMENTS

| | | | | |
|---|---|---|---|---|
| 2,520,802 A | * | 8/1950 | Hampton | F16L 55/172 138/99 |
| 3,690,150 A | * | 9/1972 | Mullen | F17D 5/02 73/40.5 R |

(Continued)

OTHER PUBLICATIONS

International Search Report issued in PCT/US17/24582 dated Jun. 19, 2017.

(Continued)

*Primary Examiner* — Patrick F Brinson
(74) *Attorney, Agent, or Firm* — Greenblum & Bernstein, P.L.C.

(57) ABSTRACT

Systems and methods for detecting and sealing a leak in a low-pressure transportation system including a low-pressure environment having a wall with an outer and an inner surface and an interior, and a hole passing through the wall that defines the leak in the low-pressure transportation system. The systems and methods including at least two sensors provided within the interior of the low-pressure environment that are structured and arranged to detect the leak, a controller in communication with the at least two sensors, a membrane deployer in communication with the controller, and a sealing membrane deployable by the membrane deployer and structured and arranged to provide a pressure-tight seal over the hole on the outer surface of the wall to seal the leak.

22 Claims, 10 Drawing Sheets

(51) Int. Cl.
 *B64C 39/02* (2006.01)
 *B64D 1/12* (2006.01)

(56) References Cited

U.S. PATENT DOCUMENTS

| | | | | |
|---|---|---|---|---|
| 4,796,466 | A * | 1/1989 | Farmer | F17D 5/02 |
| | | | | 702/51 |
| 5,040,579 | A | 8/1991 | Kawamura et al. | |
| 5,272,646 | A * | 12/1993 | Farmer | G01M 3/2815 |
| | | | | 340/605 |
| 5,497,808 | A * | 3/1996 | Schlund | F16L 55/1683 |
| | | | | 138/97 |
| 5,706,862 | A * | 1/1998 | Meinerding, Sr. | F16L 33/02 |
| | | | | 138/98 |
| 6,296,021 | B1 * | 10/2001 | Lew | F16L 55/1683 |
| | | | | 138/98 |
| 8,061,389 | B2 * | 11/2011 | McEwan | F16L 55/162 |
| | | | | 138/98 |
| 8,424,571 | B2 * | 4/2013 | Brooks | F16L 55/1683 |
| | | | | 138/97 |
| 9,158,026 | B2 * | 10/2015 | Kesar | G01S 13/04 |
| 2007/0131297 | A1 * | 6/2007 | Spaolonzi | G01M 3/047 |
| | | | | 138/104 |
| 2008/0313881 | A1 | 12/2008 | Liepert | |
| 2012/0250010 | A1 | 10/2012 | Hannay | |
| 2015/0204475 | A1 * | 7/2015 | Brooks | F16L 55/1683 |
| | | | | 138/99 |
| 2016/0223120 | A1 | 8/2016 | Gagliardo | |

OTHER PUBLICATIONS

Written Opinion of the International Searching Authority issued in PCT/US17/24582 dated Jun. 19, 2017.

* cited by examiner

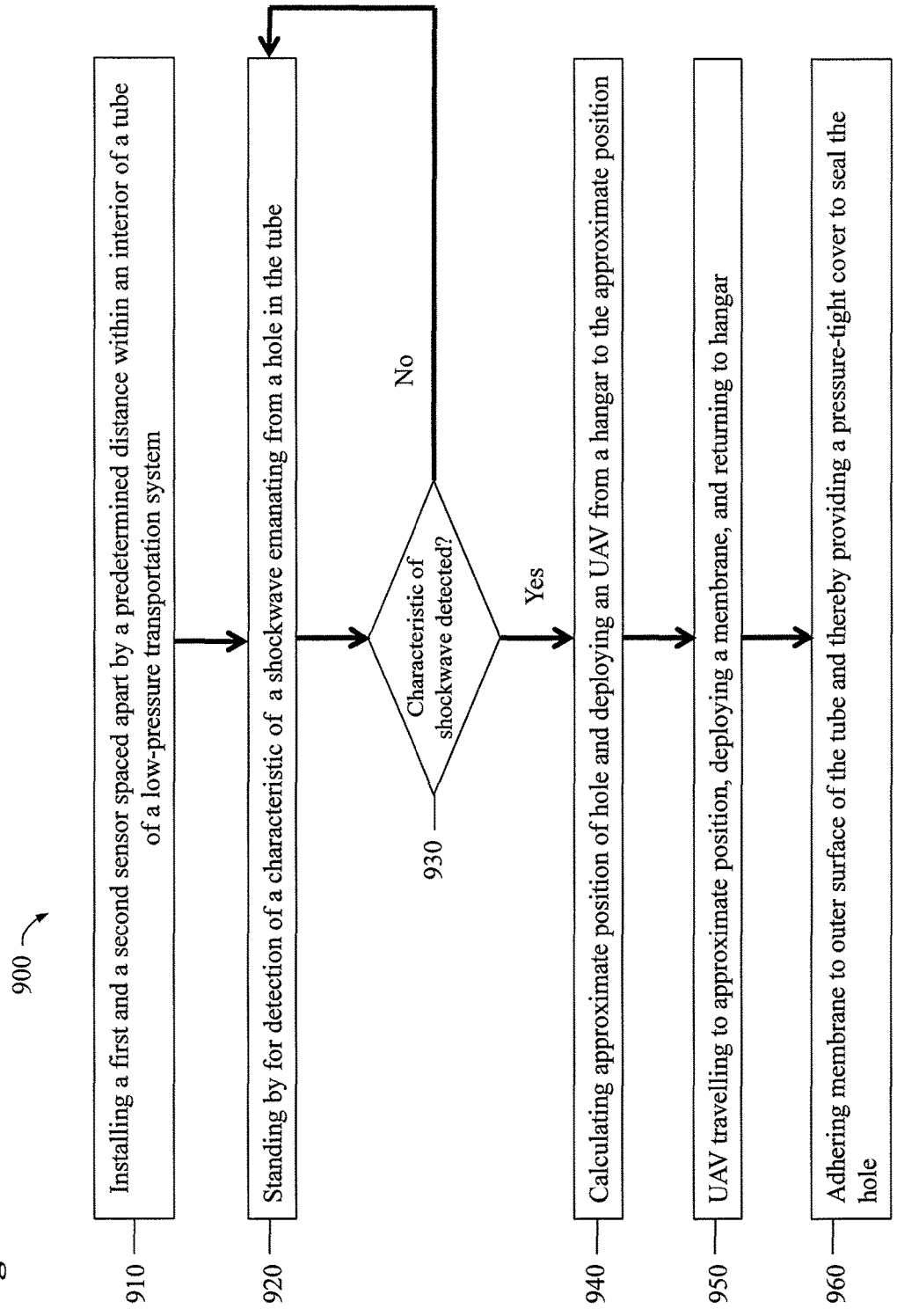

SYSTEMS AND METHODS FOR LEAK DETECTION AND SEALING

CROSS REFERENCE TO RELATED APPLICATIONS

The present application claims the benefit of U.S. Provisional Application No. 62/314,077 filed on Mar. 28, 2016, the content of which is expressly incorporated herein by reference in its entirety.

FIELD OF THE DISCLOSURE

The present disclosure relates to the detection and sealing of leaks in a pressure controlled system, namely systems and methods for detecting and locating potential leaks in a tubular transportation system, and systems and methods for sealing the detected leak.

BACKGROUND OF THE DISCLOSURE

Traditional transportation modes via water, land, rail, and air revolutionized the movement and growth of our current culture. Adverse environmental, societal, and economic impacts of these traditional transportation modes, however, initiated a movement to find alternative transportation modes that take advantage of the significant improvements in transportation technology, and that efficiently move people and materials between locations. High-speed transportation systems utilizing rails or other structural guidance components have been contemplated as a solution to existing transportation challenges while improving safety, decreasing the environmental impact of traditional transportation modes and reducing the overall time commuting between major metropolitan communities.

A high-speed, high-efficiency transportation system utilizes a low-pressure environment in order to reduce drag on a vehicle at high operating speeds, thus providing the dual benefit of allowing greater speed potential and lowering the energy costs associated with overcoming drag forces. In embodiments, these systems may use a near-vacuum (e.g., low-pressure) environment within a tubular structure.

The tubular structure will be subjected to various environmental, weather, and/or seismic conditions, such as, high winds, thermal variations, and earthquakes that may impart forces on the tubular structure and may rupture portions of the tubular structure. If the tubular structure cannot maintain a low-pressure (e.g., near vacuum) environment due to such ruptures however, the drag on a vehicle traversing the tubular structure would increase dramatically. To counter the increase in the drag force acting on the vehicle resulting from the loss of the low-pressure state, the transportation system may increase the thrust acting on the vehicle to maintain the vehicle at the high operating speed; however, the energy load required to increase the thrust acting on the vehicle is inefficient and uneconomical. Accordingly, there exists a need for improved systems and methods for the automatic detection and rapid sealing of leaks in a tubular transportation system that may slow or eliminate pressure loss and for maintaining the low-pressure environment in the tubular transportation system.

SUMMARY OF THE EMBODIMENTS OF THE DISCLOSURE

Aspects of the present disclosure are directed to a system for detecting and sealing a leak in a pressure controlled transportation system comprising a pressure controlled environment having a wall with an outer and an inner surface and an interior, and a hole passing through the wall that defines the leak in the pressure controlled transportation system. The system comprising: at least two sensors provided within the interior of the pressure controlled environment that are structured and arranged to detect the leak; a controller in communication with the at least two sensors; a membrane deployer in communication with the controller; and a sealing membrane deployable by the membrane deployer and structured and arranged to provide a pressure-tight seal over the hole on the outer surface of the wall to seal the leak.

In embodiments, the membrane deployer is an aerial vehicle, and the aerial vehicle is structured and arranged to transport the sealing membrane to the hole and to deploy the sealing membrane.

In additional embodiments, the aerial vehicle is unmanned.

In some embodiments, the aerial vehicle comprises a shell launcher that is structured and arranged to deploy the sealing membrane in a folded state within a shell.

In certain embodiments, the sealing membrane is structured and arranged to separate from the shell and unfurl from the folded state to an unfolded state prior to sealing the leak.

In yet further embodiments, the at least two sensors comprises a first sensor and a second sensor that are arranged at positions that are spaced apart by a predetermined distance within the interior of the pressure controlled environment.

In further embodiments, the first sensor is structured and arranged to measure a characteristic associated with a first leading shockwave emanating from the hole. The second sensor is structured and arranged to measure a characteristic associated with a second leading shockwave emanating from the hole. The controller is configured to approximate a position of the hole based upon the measured characteristic associated with the first leading shockwave, the measured characteristic associated with the second leading shockwave, and the predetermined distance.

In additional embodiments, the characteristic associated with the first leading shockwave comprises a time that the first leading shockwave is detected by the first sensor and the characteristic associated with the second leading shockwave comprises a time that the second leading shockwave is detected by the second sensor.

In some embodiments, the characteristic associated with the first leading shockwave comprises an amplitude of the first leading shockwave, and the characteristic associated with the second leading shockwave comprises an amplitude of the second leading shockwave.

In certain embodiments, the sealing membrane comprises a membrane material and an adhesive provided on a pressure controlled environment-facing side of the membrane material. The adhesive is structured and arranged to adhere to the outer surface of the pressure controlled environment and to resist a pressure differential that urges portions of the sealing membrane through the hole.

In yet further embodiments, the sealing membrane further comprises a reinforcement material that reinforces the sealing membrane.

In further embodiments, the sealing membrane comprises at least one gauge operable to measure at least one characteristic associated with the sealing membrane and operable to communicate the characteristic to the controller.

In additional embodiments, the at least one sensor is at least one of a microphone and a pressure gauge.

Additional aspects of the present disclosure are directed to a method for detecting an approximate position of a leak in a pressure controlled transportation system comprising a pressure controlled environment having a wall with an outer and an inner surface and an interior, and a hole passing through the wall that defines the leak in the pressure controlled transportation system, at least a first and a second sensor arranged at respective positions a predetermined distance apart within the interior of the pressure controlled environment, and a controller in communication with the first and second sensor. The method comprising: communicating the positions of the first and second sensors within the interior of the pressure controlled environment to the controller; measuring, with the first sensor, a characteristic associated with a first leading shockwave emanating from the hole; measuring, with the second sensor, a characteristic associated with a second leading shockwave emanating from the hole; and calculating, using the controller, an approximate position of the hole in the pressure controlled environment based upon the positions of the first and second sensors, the characteristic associated with the first leading shockwave, and the characteristic associated with the second leading shockwave.

In certain embodiments, the characteristic associated with the first leading shockwave comprises a time that the first leading shockwave is detected by the first sensor, and the characteristic associated with the second leading shockwave comprises a time that the second leading shockwave is detected by the second sensor.

In yet further embodiments, the characteristic associated with the first leading shockwave comprises an amplitude of the first leading shockwave, and the characteristic associated with the second leading shockwave comprises an amplitude of the second leading shockwave.

In further embodiments, the first and second sensors are microphones.

In additional embodiments, the first and second sensors are pressure gauges.

In certain embodiments, the first sensor is a sensor that first detects the shockwave.

In yet further embodiments, the second sensor is a sensor that detects the shockwave after a first sensor.

Additional aspects of the present disclosure are directed to a method for detecting and sealing a leak in a pressure controlled transportation system comprising a pressure controlled environment having a wall with an outer and an inner surface, and an interior, a hole passing through the wall that defines the leak in the pressure controlled transportation system, at least a first and a second sensor arranged at respective positions a predetermined distance apart within the interior of the pressure controlled environment, a controller in communication with the first and second sensor, an aerial vehicle in communication with the controller, and a sealing membrane deployable by the aerial vehicle and structured and arranged to provide a pressure-tight seal over the hole on the outer surface of the wall to seal the leak. The method comprising: communicating the positions of the first and second sensors within the interior of the pressure controlled environment to the controller; measuring, with the first sensor, a characteristic associated with a first leading shockwave emanating from the hole; measuring, with the second sensor, a characteristic associated with a second leading shockwave emanating from the hole; calculating, using the controller, an approximate position of the hole in the pressure controlled environment based upon the positions of the first and second sensors, the characteristic associated with the first leading shockwave, and the characteristic associated with the second leading shockwave; instructing, using the controller, the aerial vehicle to transport the sealing membrane to the approximate position of the hole; and deploying the sealing membrane from the aerial vehicle to seal the leak.

In embodiments, the method includes adhering the sealing membrane to the outer surface of the pressure controlled environment with an adhesive to resist a pressure differential that urges portions of the sealing membrane through the hole.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein:

FIG. 9 illustrates an exemplary process for detecting and filling a hole that develops in the tube wall of the low-pressure transportation system in accordance with aspects of the present disclosure.

DETAILED DISCLOSURE

Figure 1:
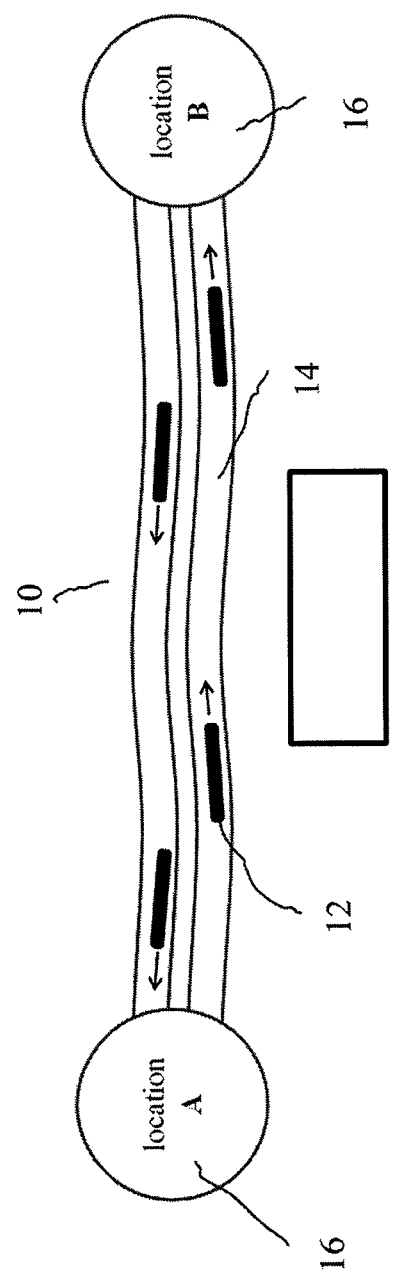
FIG. 1 is a schematic view of a transportation system in accordance with aspects of the present disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also indicate that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions (unless otherwise explicitly indicated).

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e., the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" indicates "only A, or only B, or both A and B." In the case of "only A," the term also covers the possibility that B is absent, i.e., "only A, but not B."

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

The various embodiments disclosed herein can be used separately and in various combinations unless specifically stated to the contrary.

Referring to FIG. 1, a transportation system 10 in accordance with aspects of the present disclosure is illustrated. In embodiments, the transportation system 10 comprises one or more vehicles, capsules, or transport pods 12 traveling through at least one enclosed structure (e.g., a tube) 14 between two or more stations 16. In one exemplary embodiment of the present disclosure, the capsules 12 of the transportation system 10 move through a low-pressure environment within the at least one enclosed structure 14. In accordance with certain aspects of the present disclosure, a low-pressure environment includes (but is not limited to) any pressure that is below 1 atmosphere (or approximately 1 bar) at sea level.

Some elements of a high-speed transportation system are discussed in commonly-assigned U.S. application Ser. No. 15/007,783, entitled "Transportation System," filed in the USPTO on Jan. 27, 2016, the entire content of which is expressly incorporated by reference herein in its entirety.

In embodiments of the present disclosure, a transportation system comprises one or more partially evacuated enclosed structures 14 that connect the stations 16 in a closed loop system. In embodiments, enclosed structures 14 may be sized for optimal air flow around the capsule 12 to improve performance and energy consumption efficiency at the expected or design travel speed. In accordance with aspects of the present disclosure, the low-pressure environment in the enclosed structures 14 minimizes the drag force on the capsule 12, while maintaining the relative ease of pumping out the air from the tubes.

Figure 2:
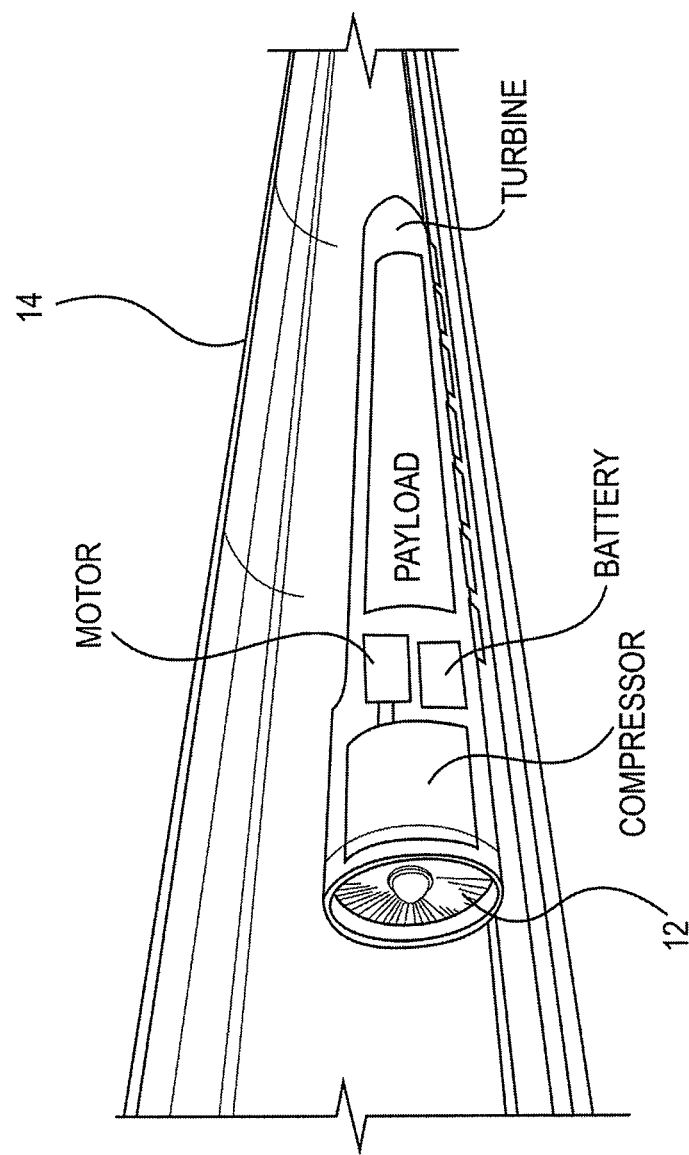
FIG. 2 illustrates a view of an exemplary capsule or vehicle for use in the transportation system in accordance with aspects of the present disclosure.

Referring now to FIG. 2, an exemplary and non-limiting depiction of a capsule or transport pod 12 of the transportation system is illustrated. In embodiments, the capsule 12 may be streamlined to reduce an air drag coefficient as the capsule 12 travels through the low-pressure environment of the at least one enclosed structure 14 (e.g., tube) of the transportation system. In accordance with aspects of the disclosure, in certain embodiments, a compressor arranged at the front end of the capsule is operable to ingest at least a portion of the incoming air and pass it through the capsule (instead of displacing the air around the vehicle). Additionally, as schematically shown in the exemplary embodiment of FIG. 2, in embodiments, the compressed air may be used to spin a turbine, for example, located at the rear end of the capsule, to provide power to the capsule 12. As schematically shown in the exemplary embodiment of FIG. 2, the capsule 12 may also include a motor structured and arranged to drive the compressor, and a battery for storing energy, e.g., derived from the turbine. The capsule 12 also includes a payload area, which may be configured for humans, for cargo, and/or for both humans and cargo.

Figure 3:
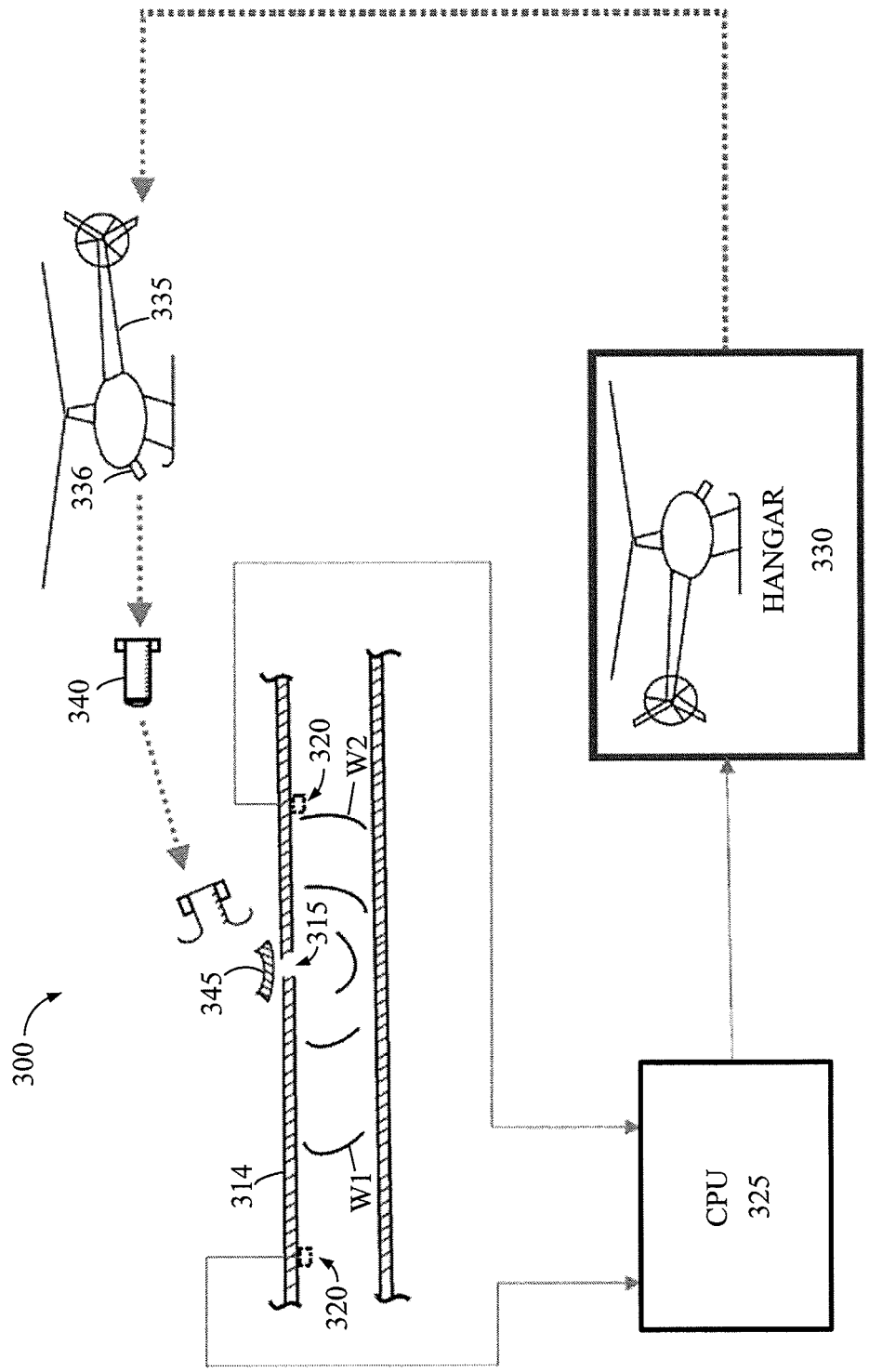
FIG. 3 illustrates a schematic view of elements of a leak detection and sealing system for use in the transportation system in accordance with aspects of the present disclosure.

FIG. 3 illustrates a schematic view of elements of a leak detection and sealing system 300 for use in the transportation system in accordance with aspects of the present disclosure. As shown in the exemplary and non-limiting embodiment of FIG. 3, a hole 315 (or leak) may develop through a portion of the tube 314 of the low-pressure transportation system. The hole 315 may develop as a result of, e.g., rupture due to exposure to the elements, blunt force impact from an object, etc. In embodiments, the pressure of the interior environment within the tube 314 is lower than the pressure of the exterior environment (e.g., atmospheric pressure) that surrounds the tube 314 such that, upon formation of the hole 315, the pressure differential between the interior environment and the exterior environment causes one or more shockwaves (e.g., a first leading shockwave $W_1$ and a second leading shockwave $W_2$) to propagate from the hole 315 and through the interior of the tube 314. In embodiments, the magnitude of the pressure differential between the exterior environment and the interior environment may be e.g., 1 atmosphere, depending on the pressure of the low-pressure environment within the tube 314 and the exterior environment surrounding the tube 314.

Although the leak detection and sealing systems and methods described in the exemplary embodiments are applied to tubes of the low-pressure transportation system, aspects of the present disclosure are not limited to tubes. That is, in embodiments the leak detection systems and methods described herein may be applied to other low-pressure environment structures such as, for example, the low-pressure environment structures discussed in commonly-assigned U.S. Pat. No. 9,566,987, entitled "Low-Pressure Environment Structures," dated Feb. 14, 2017, the entire content of which is expressly incorporated by reference herein in its entirety.

Referring to FIG. 3, according to exemplary aspects of the present disclosure, the system 300 may include a plurality (e.g., two) sensors 320 that measure first and second leading shockwaves $W_1$, $W_2$, which are configured to communicate the measurements (e.g., wirelessly and/or over a wired connection) to a controller 325 (e.g., a central processing unit (CPU)) that utilizes the measurements to approximate a position of the hole 315 (as described below). As shown in FIG. 3, in accordance with aspects of the present disclosure the system 300 further includes a hangar 330 in communication (e.g., wirelessly and/or over a wired connection) with the CPU 325. The CPU 325 is operable to instruct deployment of an unmanned aerial vehicle (UAV) 335 (i.e., a membrane deployer) to the approximate position of the hole 315. In embodiments, a plurality of hangars (not shown) may be provided at predetermined positions along the transportation system such that the UAV 335 may be rapidly deployed (e.g., within one minute) to remote locations along the transportation system (not shown). In addition, though the exemplary UAV 335 may be an unmanned aerial vehicle, in accordance with aspects of the present disclosure the vehicle may be operated directly and/or remotely by a human, and the vehicle may further operate on land (e.g., by traveling along the exterior surface of the tube) and/or in water (e.g., as a submersible).

As schematically depicted in FIG. 3, the UAV 335 may further include at least one sensor (not shown) such as for example, a camera, radar, etc., and a shell launcher 336. In embodiments, upon arrival at the approximate position of the hole 315, the exemplary UAV 335 locates a precise position of the hole 315 (e.g., the CPU 325 and/or a user operating the UAV 335 determines the precise position of the hole from images taken by the camera and/or from radar signatures of the tube 314 at the approximate position of the hole, etc.). In embodiments, the shell launcher 336 of the UAV 335 launches a shell 340 containing a sealing membrane 345 at the position (i.e., the approximate and/or the precise position) of the hole 315 (as described below). According to aspects of the present disclosure, the sealing membrane 345 may provide a temporary seal that temporarily patches the hole 315 so as to maintain and/or help restore the low-pressure environment within the interior of the tube 314. In embodiments, the sealing membrane 345 provides time for a maintenance crew to arrive and to more permanently repair the hole 315 in the tube 314. By implementing aspects of the present disclosure, the hole 315 may be rapidly and automatically sealed with the sealing membrane 345 to maintain and/or reestablish the low-pressure environment within the interior of the tube 314 upon formation of a leak (e.g., a hole), thereby reducing energy loss and cost increases due to operation of the transportation system at increased pressures (e.g., resulting from increased drag on the capsule and/or decreased operation speed).

Figure 4:
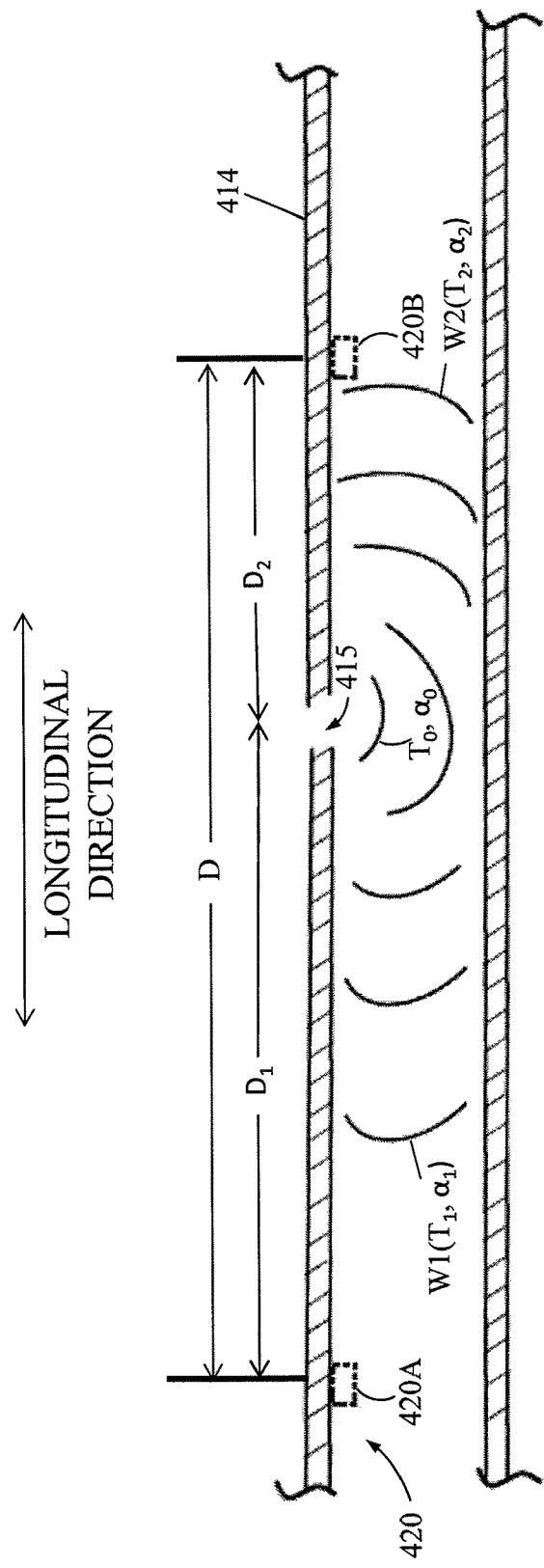
FIG. 4 illustrates a schematic partial cut-away view of an exemplary tube of the low-pressure transportation system with a hole (or leak) developed therein in accordance with aspects of the present disclosure.

FIG. 4 illustrates a schematic partial cut-away view of an exemplary tube 414 of the low-pressure transportation system with the hole 415 (or leak) developed therein in accordance with aspects of the present disclosure. In embodiments, at least two sensors 420 are disposed on an inner circumferential surface of the tube 414, which are structured and arranged to measure a characteristic associated with a shockwave emanating from the hole 415. In embodiments the sensors 420 may include, e.g., one or more of a microphone, a pressure gauge, an accelerometer, a thermometer, etc.

According to aspects of the present disclosure, the sensors 420 include a first sensor 420A structured and arranged to measure a characteristic associated with a first leading shockwave $W_1$ (e.g., the time $T_1$ the first leading shockwave $W_1$ is detected by the first sensor 420A, the amplitude $\alpha_1$ of the first leading shockwave $W_1$ detected by the first sensor 420A, etc.) that originated from the hole 415. In embodiments, the first sensor 420A includes a position identifier that communicates the position of the first sensor 420A within the low-pressure transportation system to the controller. The sensors 420 further include a second sensor 420B structured and arranged to measure a characteristic associated with a second leading shockwave $W_2$ (e.g., the time $T_2$ the second leading shockwave $W_2$ is detected by the second sensor 420B, the amplitude $\alpha_2$ of the second leading shockwave $W_2$ detected by the second sensor 420B, etc.) that originated from the hole 415. In embodiments, the second sensor 420B includes a position identifier that communicates the position of the second sensor 420B within the low-pressure transportation system to the controller.

In the exemplary embodiment depicted in FIG. 4, the first sensor 420A and the second sensor 420B are spaced apart by a predetermined distance D in the longitudinal direction of the tube 414. In embodiments, the low pressure transportation system may include a plurality of sensors 420 (i.e., more than two), which may each have a position identifier that communicates the position of the respective sensor 420 to the controller. The plurality of sensors 420 within the tube 414 may be distributed at fixed, regular distances (e.g. a quarter of a mile) in the longitudinal direction of the tube 414. In embodiments, the sensors 420 may be provided on an inner circumferential surface of the tube 414.

Referring to FIG. 4, though the exemplary first and second sensors 420A, 420B are provided at approximately the same position along the circumference of the tube 414 at each respective longitudinal position of the tube 414, the present disclosure is not limited to this exemplary embodiment. That is, each sensor 420 may be arranged along any part of the circumferential surface of the tube 414 (i.e., irrespective of the circumferential arrangement of other sensors) provided that the sensors 420 do not interfere with a traversing vehicle (not shown) within the tube 414. By implementing aspects of the disclosure, the positions of the sensors and the measurements from the sensors 420 may be used to calculate, e.g., the distance $D_1$ from the first sensor 420A to the hole 415, the distance $D_2$ from the second sensor 420B to the hole 415, the time $T_0$ that the shockwave emanated from the hole 415, and/or the amplitude $\alpha_0$ of the shockwave as it emanated from the hole 415 to automatically approximate the position of the hole 415 (as described below).

Figure 5:
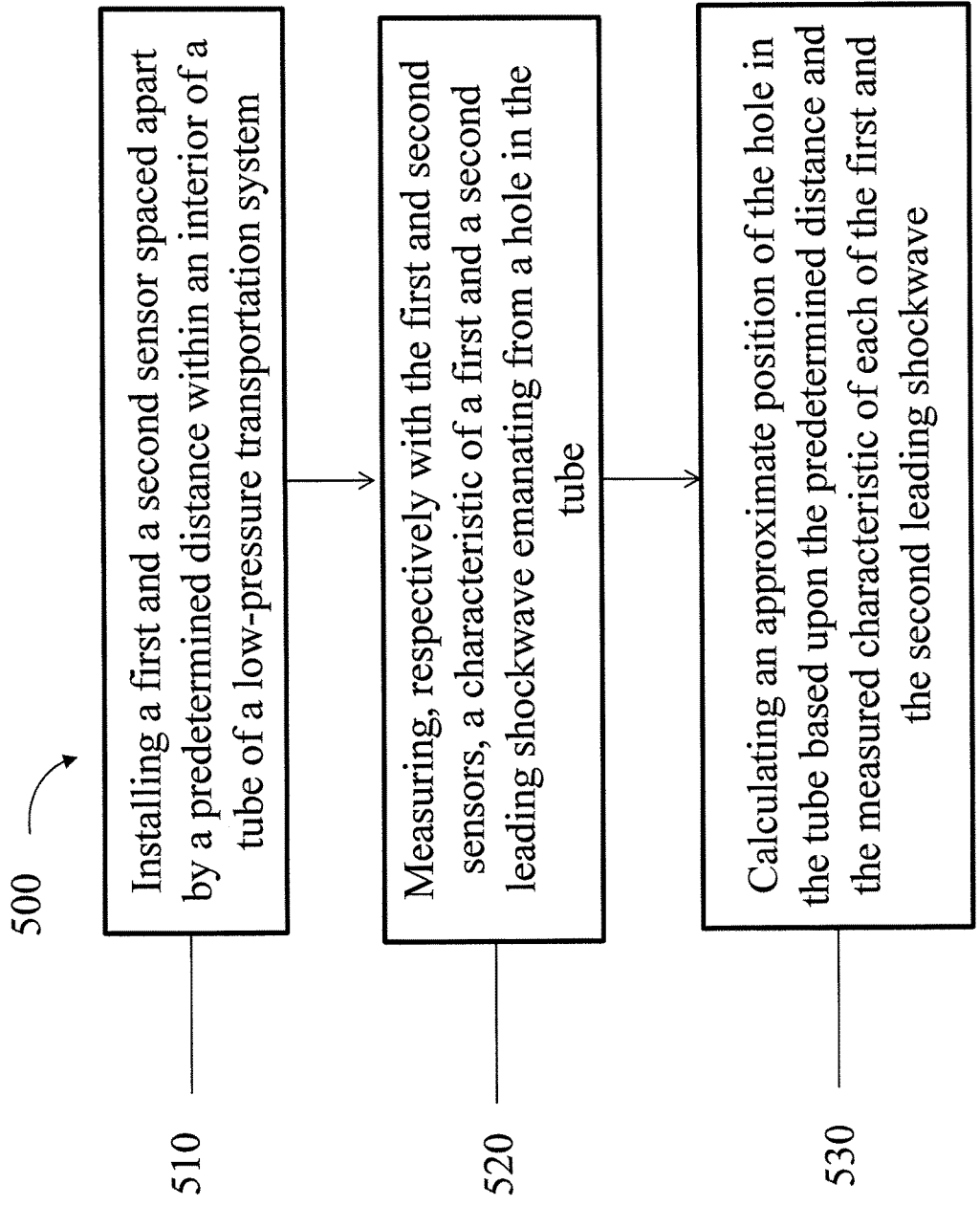
FIG. 5 illustrates an exemplary process for approximating the position of a hole that develops in the tube wall between two sensors of the low-pressure transportation system in accordance with aspects of the present disclosure.

FIG. 5 illustrates an exemplary process 500 for approximating the position of a hole that develops in the tube wall between at least two sensors of the low-pressure transportation system in accordance with aspects of the present disclosure. As illustrated in FIG. 5, at step 510, at least a first and second sensor are installed spaced apart by a predetermined longitudinal distance D within an interior of a tube of a low-pressure transportation system (e.g., on an inner circumferential surface of the tube). The first and second sensor are electrically connected (e.g., directly and/or wirelessly) with a controller (e.g., a CPU). In embodiments, the first and second sensors are operable to communicate their respective longitudinal positions in the tube and the controller determines the predetermined longitudinal distance D between the first and second sensors. In further embodiments, once the sensors are installed, for example, at predetermined locations, which may be regularly spaced, their respective installation locations can be stored in a memory, e.g., a database. In embodiments, a plurality (i.e., more than two) sensors may be provided along the tube transportation path, and the controller is operable to determine the longitudinal distance D between any two of the plurality of sensors.

At step 520, the hole develops in the tube wall between the first sensor and the second sensor and the first sensor measures a characteristic associated with a first leading shockwave that emanated from the hole and communicates the characteristic to the controller. Further, in accordance with aspects of the disclosure, the second sensor measures a characteristic associated with a second leading shockwave, which emanated from the hole at the same unknown time $T_0$ as the first leading shockwave and that travels in an opposite direction from the first leading shockwave. The second sensor communicates the characteristic of the second leading shockwave to the controller. In embodiments the characteristic associated with the leading shockwaves measured by the respective sensors may include, e.g., the amplitude of the leading shockwave at the sensor, and/or the time the shockwave is sensed by the respective sensor, etc. The characteristic associated with the shockwave changes as a function of distance from the hole.

At step 530, the controller calculates an approximate position of the hole that developed in the tube between the first sensor and the second sensor utilizing the predetermined distance D between the first and the second sensors and the measured characteristic associated with each of the first and the second leading shockwave. In embodiments, the controller is operable to calculate the approximate position of a hole that develops in the tube wall between any two of the plurality of sensors. In certain embodiments, the controller may be configured to filter out noise measured by the sensors that does not correspond to the characteristic associated with the shockwave emanating from the hole between the sensors For example in embodiments, noise caused by a vehicle traveling within the tube may be filtered out. In certain embodiments, the controller may be operable to deactivate particular sensors, for example, as a vehicle passes by.

With an exemplary and non-limiting embodiment of the present disclosure, time is utilized as the characteristic associated with the shockwaves to determine an approximate location of the newly-formed hole (or leak). In accordance with aspects of the disclosure, as the hole forms in the tube, a series of shockwaves (including a leading shockwave) propagate through the tube outwardly from the hole location, which can be detected by the plurality of sensors. By detecting an arrival of the leading shockwave on each side of the hole by respective sensors, and knowing a distance between the two sensors, the controller is operable to determine an approximate location of the hole.

According to this embodiment, the first sensor is configured to measure a time $T_1$ that the leading shockwave propagating in a first direction (or "first leading shockwave") is detected and the second sensor is configured to measure a time $T_2$ that the leading shockwave propagating in a second direction (or "second leading shockwave") is detected. The distance that a shockwave travels may be calculated by multiplying the speed of the shockwave as it traversed the distance (i.e., the speed of sound $V_s$) times the time the shockwave took to traverse the distance (Distance= (Speed)(Time)). The speed of sound $V_s$ is a known function of the conditions of the medium through which the shockwave travels (e.g., temperature, pressure, etc.), and said conditions of the medium may be estimated by the controller and/or measured by sensors within the tube that communicate with the controller.

Therefore, the distance $D_1$ between the hole (or leak) from which the first leading shockwave emanated from and the first sensor may be calculated by multiplying the speed of sound $V_s$ times the difference between the time $T_1$ that the first leading shockwave is measured by the first sensor and the time $T_0$ that the first leading shockwave emanated from the hole, or $D_1 = V_s (T_1 - T_0)$. In a similar manner, the distance $D_2$ between the hole (or leak) from which the second leading shockwave emanated from may be calculated by multiplying the speed of sound $V_s$ times the difference between the time $T_2$ that the second leading shockwave is measured by the second sensor and the time $T_0$ that the second leading shockwave emanated from the hole, or $D_2 = V_s (T_2 - T_0)$. As discussed above, the first and second leading shockwaves emanated from the hole at the same initial unknown time $T_0$. In addition, since the hole is disposed between the first and second sensors, the predetermined distance D calculated by the controller from the communicated positions of the first and second sensors is equal to the sum of the distance $D_1$ between the hole and the first sensor and the distance $D_2$ between the hole and the second sensor, or $D = D_1 + D_2$.

In accordance with aspects of the disclosure, with this exemplary embodiment, the controller is operable to solve (e.g., using linear algebra) for the three unknown values, namely the time $T_0$ that the first and second leading shockwaves emanated from the hole, and the distances $D_1$, $D_2$ between the hole and the first and second sensors, respectively, using the three equations $D_1=Vs\,(T_1-T_0)$; $D_2=Vs\,(T_2-T_0)$; $D=D_1+D_2$. Upon solving for the distances $D_1$, $D_2$ between the hole and the first and second sensors, respectively, the controller is operable to approximate the position of the hole utilizing the positions of the first and second sensors, e.g., communicated to the controller and the calculated distances $D_1$, $D_2$ between the hole and the first and second sensors, respectively.

According to another exemplary embodiment, the controller may approximate the position of the hole in the tube relative to two respective sensors (each arranged on different sides of the hole) by utilizing first and second sensors configured to measure the amplitude of the "first leading shockwave" and the "second leading shockwave" $\alpha_1$, $\alpha_2$, respectively. The amplitude of a shockwave at a distance from a source may be represented as an attenuation function $\alpha(X)$ (e.g., $\alpha_0/X$, $\alpha_0/X^2$, etc. ..., where $\alpha_0$ is the amplitude of the shockwave at the source). This function may be determined through routine experimentation within the environment that the shockwave travels through (e.g., the tube and/or other low-pressure environment structure). For example, a testing structure may comprise a transportation tube having a low-pressure environment, and a plurality of regularly-spaced sensors configured to measure wave amplitude. A leak in the tube wall may be created and the amplitude of the shockwave can be quantified using the regularly-spaced sensors. This quantification of the attenuation (or diminishment) of the amplitude can be used with the relative distances of the respective sensors from the hole location to experimentally determine the attenuation function.

In accordance with aspects of the disclosure, with this exemplary embodiment the first and second sensors measure the amplitudes of the first and second leading shockwaves $\alpha_1$, $\alpha_2$ at the first and second sensors, respectively, and the controller is operable to solve for the three unknown values, namely the amplitude $\alpha_0$ of the first and second leading shockwaves as they emanated from the hole (which is the same amplitude $\alpha_0$ for both the first and second leading shockwaves), and the distances $D_1$, $D_2$ between the hole and the first and second sensors, respectively, using the three equations $\alpha_1=\alpha(D_1)$, $\alpha_2=\alpha(D_2)$, $D=D_1+D_2$. Upon solving for the distances $D_1$, $D_2$ between the hole and the first and second sensors, respectively, the controller is operable to approximate the position of the hole utilizing the positions of the first and second sensors, e.g., communicated to the controller and the calculated distances $D_1$, $D_2$ between the hole and the first and second sensors, respectively.

Figure 6C:
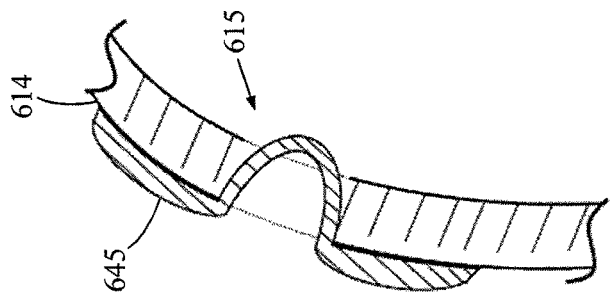
FIGS. 6A-6C illustrate partial cut-away views of an exemplary tube of the low-pressure transportation system with a hole (or leak) developed therein and a system of sealing the hole with a sealing membrane in accordance with aspects of the present disclosure.
Figure 6B:
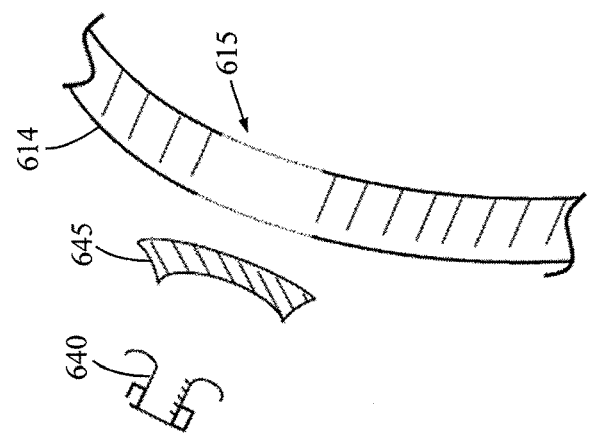
Figure 6A:
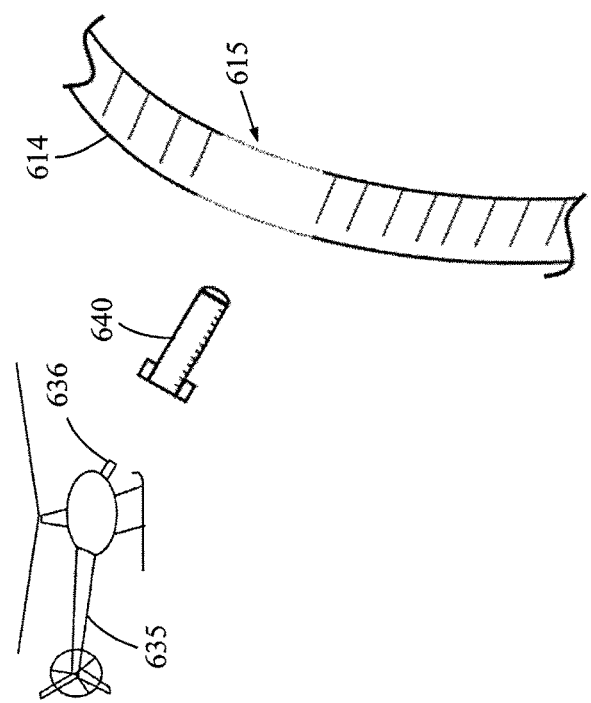

FIGS. 6A-6C illustrate partial cut-away views of an exemplary tube of the low-pressure transportation system with a hole 615 (or leak) developed therein and a system for sealing the hole 615 with a sealing membrane 645 in accordance with aspects of the present disclosure. As shown in FIG. 6A, in embodiments the UAV 635 includes at least one sensor (not shown) such as for example, a camera, radar, etc., and a shell launcher 636. Upon arrival at the approximate position of the hole 615, the exemplary UAV 635 locates a precise position of the hole 615 (e.g., the controller and/or a user operating the UAV 635 determine the precise position of the hole from images taken by the camera and/or from radar signatures of the tube 614 at the approximate position of the hole, etc.). In embodiments, the shell launcher 636 of the UAV 635 launches a shell 640 containing a sealing membrane 645 at the position (i.e., the approximate and/or the precise position) of the hole 615.

According to aspects of the present disclosure, the UAV 635 may prepare the exterior surface of the tube 614 surrounding the hole 615 prior to deployment of the sealing membrane 645. In certain embodiments the UAV 635 may include a spray gun (not shown) including a nozzle that fires a cleaning solution at the exterior surface of the tube 614 surrounding the hole 615 to clean the exterior surface. The spray gun may further include a nozzle that fires an adhesive at the exterior surface of the tube 614 surrounding the hole 615 to improve the seal between the sealing membrane 645 and the exterior surface. Further, although the exemplary sealing membrane 645 is described as being launched from the UAV 635 within the shell 640, the present disclosure is not limited to this embodiment and in further embodiments (not shown) the sealing membrane may, for example, be layered over the hole 615 from a nozzle of the spray gun of the UAV 635 that sprays the layers of the sealing membrane over the hole 615. In still further embodiments, the UAV 635 itself may be configured and arranged to directly seal the hole 615 by, for example, landing over the hole 615 and forming a seal around the hole directly from the body of the UAV 635.

Referring to FIG. 6B, in an exemplary embodiment the shell 640 opens and separates from the sealing membrane 645 as the sealing membrane 645 unfurls into an open position and travels towards the hole 615. In exemplary embodiments, an explosive charge may be contained within the shell 640 and may detonate within the shell 640 to separate the shell 640 from the sealing membrane 645, and to unfurl the sealing membrane 645 from the folded stored state (not shown) to the open position depicted in the exemplary embodiment of FIG. 6B.

As depicted in FIG. 6C, upon impact with the outer surface of the tube 614, the pressure gradient between the exterior environment and the low-pressure environment within the interior of the tube 614 may force the sealing membrane 645 against the outer surface of the tube 614 to seal the hole 615 (as discussed below). By implementing aspects of the present disclosure, the low-pressure environment within the interior of the tube 614 may be maintained and/or reestablished upon formation of a leak (e.g., a hole) thereby reducing energy loss and cost increases due to operation of the transportation system at increased pressures (e.g., resulting from increased drag on the capsule and/or decreased operation speed).

Figure 7:
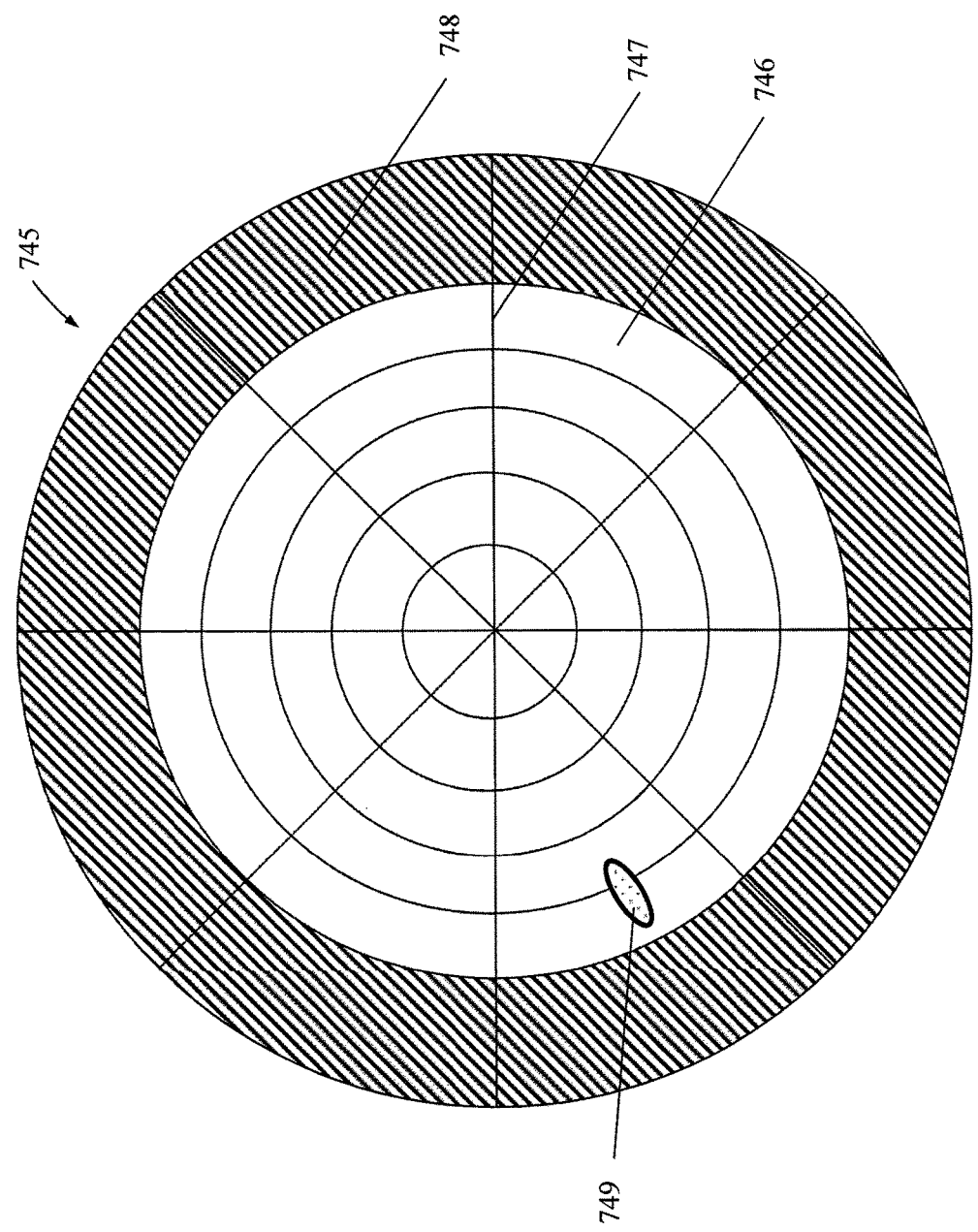
FIG. 7 illustrates a schematic view of a tube-facing side of an exemplary membrane in accordance with aspects of the present disclosure.

FIG. 7 illustrates a schematic view of a tube-facing side of an exemplary membrane 745 structured and arranged to face a tube (not shown) of a low-pressure transportation system in accordance with aspects of the present disclosure. The exemplary membrane 745 comprises a membrane material 746 (e.g., polyethylene) that is flat, light-weight, and that has a structural high-strength. In embodiments, the sealing membrane 745 further comprises a reinforcement material 747 (e.g., Kevlar, Dyneema, carbon fiber strands, etc.), which may be arranged in a spider-web formation as depicted in FIG. 7, that reinforces the sealing membrane 745 and that resists forces acting on the sealing membrane 745 when the sealing membrane 745 seals the hole in the tube of the low-pressure transportation system (as described below).

According to aspects of the present invention, the sealing membrane 745 may include an adhesive 748, provided on the tube-facing side of the sealing membrane 745, that is structured and arranged to adhere to the outer surface of the tube (not shown) upon impact. In certain embodiments, the adhesive 748 is quick setting (e.g., setting in less than 1 second, or substantially instantaneously, etc.) and is structured and arranged to adhere to both the membrane material 746 and the outer surface of the tube (upon contact therewith), which may, for example, comprise steel. In certain embodiments, the adhesive 748 may only activate after the sealing membrane 745 separates from the shell (as discussed above). For example, in some embodiments the adhesive may activate upon exposure to oxygen and the sealing membrane 745 may be stored in an oxygen-free environment in the folded state within the shell. By implementing aspects in accordance with the present disclosure, the sealing membrane 745 may be folded within the shell without the adhesive 748 interfering with the unfurling of the sealing membrane upon separation from the shell.

In embodiments, the adhesive 748 may be provided over a predetermined area of the membrane material 746. The adhesive 748 may be structured and arranged to withstand a tensile force of, e.g., 100 psi, so that, upon placement, the sealing membrane 745 is operable to resist the pressure differential between the exterior environment and the interior environment. As should be appreciated, the pressure differential applies a force to an outward-facing surface of the sealing membrane 745 from the exterior of the tube towards the interior of the tube (as described below). Further, in certain embodiments the adhesive 748 may be configured to be selectively releasable, for example, such that the sealing membrane 745 may be removed by a crew when more permanently repairing the hole, e.g., by welding a steel plate to the hole from the outer surface of the tube.

Referring to FIG. 7, according to aspects of the present disclosure, the sealing membrane 745 may also include one or more gauge(s) 749, configured to measure the strain and/or temperature of the sealing membrane 745. In embodiments, the gauge 749 may measure characteristics of the sealing membrane 745 and may communicate (e.g., wirelessly) the measured characteristics to a controller. By implementing aspects of the present disclosure, the sealing membrane 745 may signal to the controller that the sealing membrane 745 has successfully sealed the hole and/or may indicate that failure of the sealing membrane 745 is imminent, which may prompt the controller to immediately send a repair crew and/or to instruct a UAV deploy another membrane at the hole.

Figure 8B:
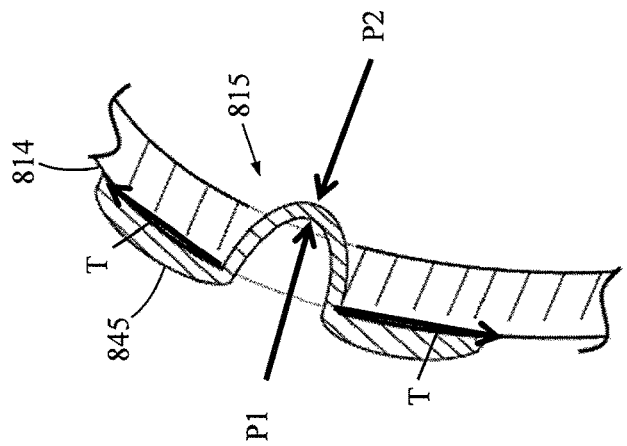
FIGS. 8A and 8B illustrate schematic views of forces acting upon the exemplary membrane as it seals the hole in the tube of the low-pressure transportation system.
Figure 8A:
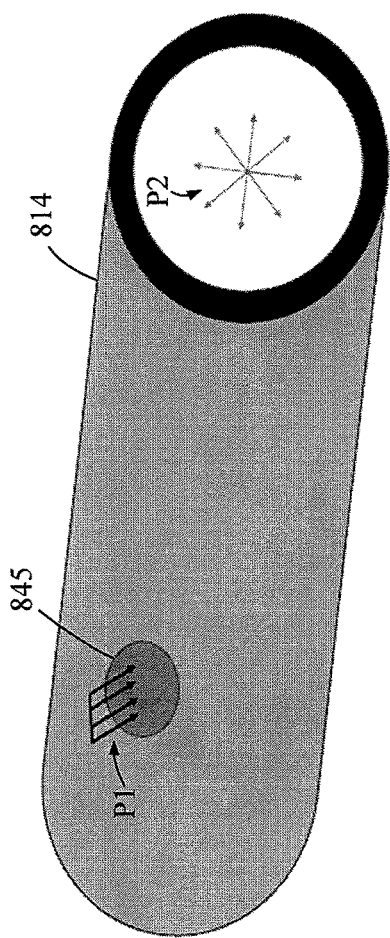

FIGS. 8A and 8B illustrate schematic views of forces acting upon the exemplary membrane 845 as it seals the hole 815 in the tube 814 of the low-pressure transportation system. As shown in FIG. 8A, pressure forces P1 and P2 are applied to the sealing membrane 845 respectively from the exterior environment and the interior environment of the tube 814. In embodiments, the pressure of the interior environment within the tube 814 is lower than the pressure of the exterior environment (e.g., atmospheric pressure) that surrounds the tube 814 such that the pressure force P1 is greater than the pressure force P2 (e.g., by approximately 1 atmosphere).

Referring to FIG. 8B, because the pressure force P1 exceeds the pressure force P2 in the exemplary embodiment, the pressure force P1 causes portions of the sealing membrane 845 to "bulge" into the hole 815 and presses other portions of the sealing membrane 845 against the exterior surface of the tube 814. In the exemplary embodiment, an adhesive (discussed above) is configured to provide a tensile force T sufficient to resist the force P1 such that the sealing membrane 845 may be maintained in a sealing position over the hole 815 without being completely sucked into the interior of the tube 814. By implementing aspects of the present disclosure, the low-pressure environment within the interior of the tube 814 may be maintained and/or reestablished upon formation of a leak (e.g., a hole) thereby reducing energy loss and cost increases due to operation of the transportation system at increased pressures (e.g., resulting from increased drag on the capsule and/or decreased operation speed).

FIG. 9 illustrates an exemplary process 900 for automatically detecting and sealing a hole that develops in the tube wall of the low-pressure transportation system in accordance with aspects of the present disclosure. At step 910, at least a first and second sensor are installed spaced apart by a predetermined longitudinal distance D within an interior of a tube of a low-pressure transportation system (e.g., on an inner circumferential surface of the tube). The first and second sensor are electrically connected (e.g., directly and/or wirelessly) with a controller (e.g., a CPU). In embodiments, the first and second sensors are operable to communicate their respective longitudinal positions in the tube and the controller determines the predetermined longitudinal distance D between the first and second sensors. In further embodiments, once the sensors are installed, for example, at predetermined locations, which may be regularly spaced, their respective installation locations can be stored in a memory, e.g., a database. In embodiments, a plurality (i.e., more than two) sensors may be provided along the tube transportation path, and the controller is operable to determine the longitudinal distance D between any two of the plurality of sensors.

At step 920, the hole develops in the tube wall between the first sensor and the second sensor and the first sensor measures a characteristic associated with a first leading shockwave that emanated from the hole and communicates the characteristic to the controller. Further, in accordance with aspects of the disclosure, the second sensor measures a characteristic associated with a second leading shockwave, which emanated from the hole at the same unknown time $T_0$ as the first leading shockwave and that travels in an opposite direction from the first leading shockwave. The second sensor communicates the characteristic of the second leading shockwave to the controller. In embodiments the characteristic associated with the leading shockwaves measured by the respective sensors may include, e.g., the amplitude of the leading shockwave at the sensor, and/or the time the shockwave is sensed by the respective sensor, etc. The characteristic associated with the shockwave changes as a function of distance from the hole.

At step 930, the controller determines whether the characteristic associated with the shockwave is detected by the sensors. If, at step 930, the controller determines that the characteristic associated with the shockwave has not been detected, the controller returns to step 920 and continues to standby for detection of the shockwave characteristic. If, at step 930, the controller determines that the characteristic associated with the shockwave has been detected, the process continues at step 940. At step 940, the controller calculates the approximate position of the hole in the tube (as discussed above) and deploys a UAV from a hangar to the approximate position (as discussed above).

At step 950, the UAV travels from the hangar to the approximate position of hole, deploys a sealing membrane, and returns to the hangar. In embodiments, the UAV is operable to determine a precise position of the hole (e.g., via a sensor on the UAV such as a camera, radar, etc.) and to deploy the sealing membrane to the position (i.e., the approximate and/or precise position) of the hole (as discussed above).

At step 960, the sealing membrane deployed by the UAV is adhered to the outer surface of the tube to provide a pressure-tight seal over the hole (as described above). By implementing aspects of the disclosure, the hole may be rapidly and automatically sealed with the sealing membrane to maintain and/or reestablish the low-pressure environment within the interior of the tube upon formation of a leak (e.g., a hole), thereby reducing energy loss and cost increases due to operation of the transportation system at increased pressures (e.g., resulting from increased drag on the capsule and/or decreased operation speed).

Aspects of embodiments of the present disclosure (e.g., the controller (e.g., CPU), the sensors, the hangar, the UAV, etc.) can be implemented by such special purpose hardware-based systems that can perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (in the form of a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet,
- a magnetic storage device
- a usb key, and/or
- a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 10:
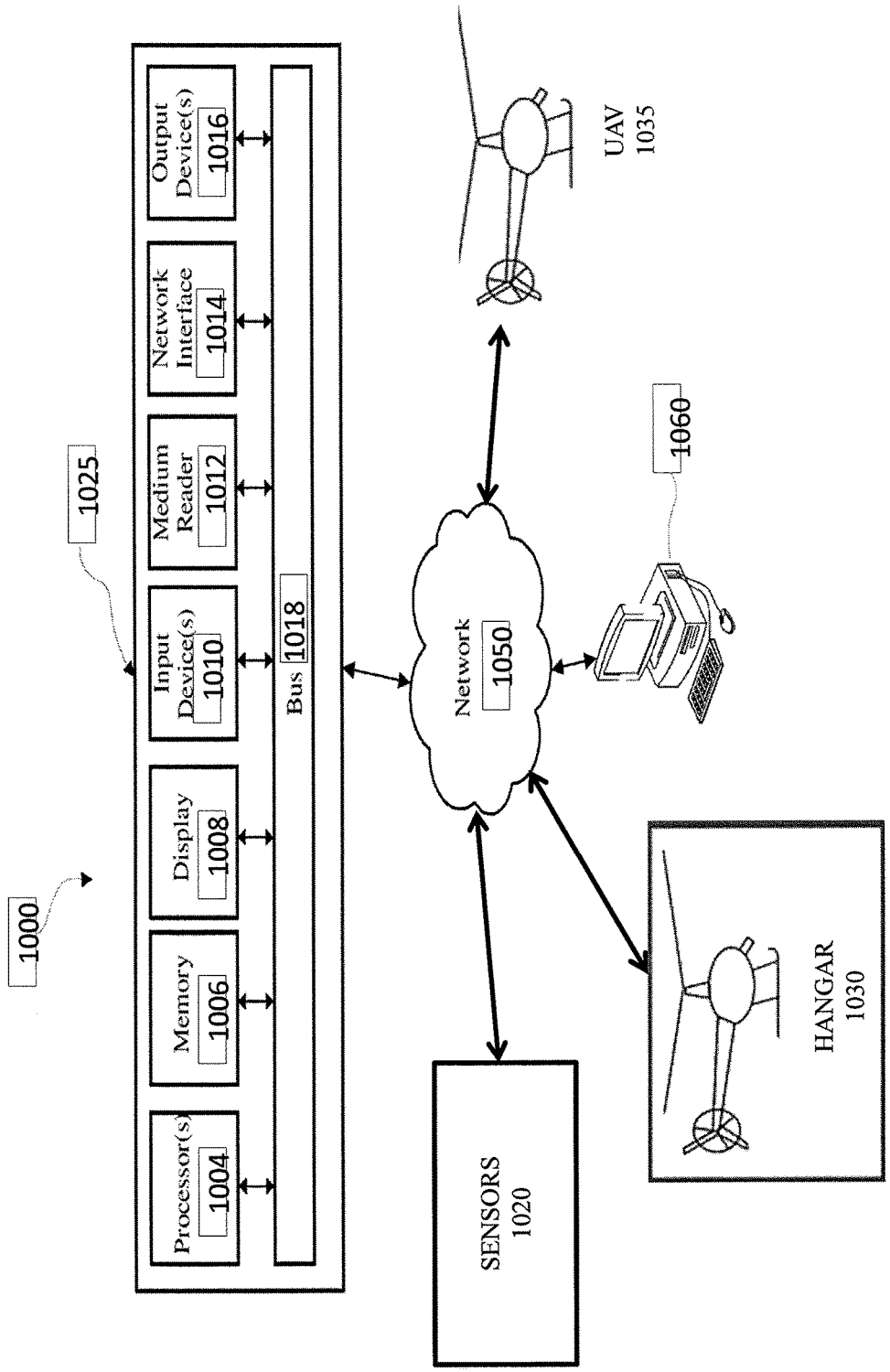
FIG. 10 is an exemplary system environment for use in accordance with the embodiments of control systems described herein.

FIG. 10 is an exemplary system for use in accordance with the embodiments described herein. The system 1000 is generally shown and may include a computer system 1025 (i.e., the controller/CPU discussed above), which is generally indicated. The computer system 1025 is connected to other systems or peripheral devices via, e.g., a network 1050 and/or direct connections (not shown). According to aspects of the present disclosure, the computer system 1025 is connected to sensors 1020 provided in the low-pressure environment (described above), to a hangar 1030 (described above), and to a UAV 1035 (described above). In embodiments, the computer system 1025 may include, or be included within, any one or more computers 1060, servers, systems, communication networks or cloud environment.

The computer system 1025 may operate in the capacity of a server in a network environment, or in the capacity of a client user computer in the network environment. The computer system 1025, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 1025 is illustrated, additional embodiments may include any collection of systems or sub-systems that individually or jointly execute instructions or perform functions.

As illustrated in FIG. 10, the computer system 1025 may include at least one processor 1004, such as, for example, a central processing unit, a graphics processing unit, or both. The computer system 1025 may also include a computer memory 1006. The computer memory 1006 may include a static memory, a dynamic memory, or both. The computer memory 1006 may additionally or alternatively include a hard disk, random access memory, a cache, or any combination thereof. Of course, those skilled in the art appreciate that the computer memory 1006 may comprise any combination of known memories or a single storage.

As shown in FIG. 10, the computer system 1025 may include a computer display 1008, such as a liquid crystal display, an organic light emitting diode, a flat panel display, a solid state display, a cathode ray tube, a plasma display, or any other known display. The computer system 1025 may include at least one computer input device 1010, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 1025 may include multiple input devices 1010. Moreover, those skilled in the art further appreciate that the above-listed, exemplary input devices 1010 are not meant to be exhaustive and that the computer system 1025 may include any additional, or alternative, input devices 1010.

The computer system 1025 may also include a medium reader 1012 and a network interface 1014. Furthermore, the computer system 1025 may include any additional devices, components, parts, peripherals, hardware, software or any combination thereof which are commonly known and understood as being included with or within a computer system, such as, but not limited to, an output device 1016. The output device 1016 may be, but is not limited to, a speaker, an audio out, a video out, a remote control output, or any combination thereof.

Furthermore, aspects of the disclosure may take the form of a computer program product accessible from a computer-usable or computer-readable medium providing program code for use by or in connection with a computer or any instruction execution system. The software and/or computer program product can be implemented in the environment of FIG. 10. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, while many of the structures discussed herein may be used in the context of a low-pressure environment for a high-speed transportation system, the enclosed environments may also be utilized in different contexts (e.g., other high-speed transportation systems, or vacuum facilities for clean rooms). Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. A system for detecting and sealing a leak in a pressure controlled transportation system comprising a pressure controlled environment having a wall with an outer and an inner surface and an interior, and a hole passing through the wall that defines the leak in the pressure controlled transportation system, the system comprising:
   at least two sensors provided within the interior of the pressure controlled environment that are structured and arranged to detect the leak;
   a controller in communication with the at least two sensors;
   a membrane deployer in communication with the controller; and
   a sealing membrane deployable by the membrane deployer and structured and arranged to provide a pressure-tight seal over the hole on the outer surface of the wall to seal the leak,
   wherein the leak is an inflow of ambient air into the pressure controlled environment due to a pressure gradient between an ambient exterior environment having a higher relative pressure and the pressure controlled environment having a lower relative pressure.

2. A system for detecting and sealing a leak in a pressure controlled transportation system comprising a pressure controlled environment having a wall with an outer and an inner surface and an interior, and a hole passing through the wall that defines the leak in the pressure controlled transportation system, the system comprising:
   at least two sensors provided within the interior of the pressure controlled environment that are structured and arranged to detect the leak;
   a controller in communication with the at least two sensors;
   a membrane deployer in communication with the controller; and
   a sealing membrane deployable by the membrane deployer and structured and arranged to provide a pressure-tight seal over the hole on the outer surface of the wall to seal the leak, wherein
   the membrane deployer is an aerial vehicle, and
   the aerial vehicle is structured and arranged to transport the sealing membrane to the hole and to deploy the sealing membrane.

3. The system for detecting and sealing the leak according to claim 2, wherein
   the aerial vehicle is unmanned.

4. The system for detecting and sealing the leak according to claim 2, wherein
   the aerial vehicle comprises a shell launcher that is structured and arranged to deploy the sealing membrane in a folded state within a shell.

5. The system for detecting and sealing the leak according to claim 4, wherein
   the sealing membrane is structured and arranged to separate from the shell and unfurl from the folded state to an unfolded state prior to sealing the leak.

6. The system for detecting and sealing the leak according to claim 1, wherein
   the at least two sensors comprises a first sensor and a second sensor that are arranged at positions that are spaced apart by a predetermined distance within the interior of the pressure controlled environment.

7. A system for detecting and sealing a leak in a pressure controlled transportation system comprising a pressure controlled environment having a wall with an outer and an inner surface and an interior, and a hole passing through the wall that defines the leak in the pressure controlled transportation system, the system comprising:
   at least two sensors provided within the interior of the pressure controlled environment that are structured and arranged to detect the leak;
   a controller in communication with the at least two sensors;

a membrane deployer in communication with the controller; and a sealing membrane deployable by the membrane deployer and structured and arranged to provide a pressure-tight seal over the hole on the outer surface of the wall to seal the leak, wherein the at least two sensors comprises a first sensor and a second sensor that are arranged at positions that are spaced apart by a predetermined distance within the interior of the pressure controlled environment, and wherein the first sensor is structured and arranged to measure a characteristic associated with a first leading shockwave emanating from the hole, the second sensor is structured and arranged to measure a characteristic associated with a second leading shockwave emanating from the hole, and the controller is configured to approximate a position of the hole based upon the measured characteristic associated with the first leading shockwave, the measured characteristic associated with the second leading shockwave, and the predetermined distance.

8. The system for detecting and sealing the leak according to claim 7, wherein
the characteristic associated with the first leading shockwave comprises a time that the first leading shockwave is detected by the first sensor, and
the characteristic associated with the second leading shockwave comprises a time that the second leading shockwave is detected by the second sensor.

9. The system for detecting and sealing the leak according to claim 7, wherein
the characteristic associated with the first leading shockwave comprises an amplitude of the first leading shockwave, and
the characteristic associated with the second leading shockwave comprises an amplitude of the second leading shockwave.

10. A system for detecting and sealing a leak in a pressure controlled transportation system comprising a pressure controlled environment having a wall with an outer and an inner surface and an interior, and a hole passing through the wall that defines the leak in the pressure controlled transportation system, the system comprising:
at least two sensors provided within the interior of the pressure controlled environment that are structured and arranged to detect the leak;
a controller in communication with the at least two sensors;
a membrane deployer in communication with the controller; and
a sealing membrane deployable by the membrane deployer and structured and arranged to provide a pressure-tight seal over the hole on the outer surface of the wall to seal the leak, wherein
the sealing membrane comprises a membrane material and an adhesive provided on a pressure controlled environment-facing side of the membrane material, and
the adhesive is structured and arranged to adhere to the outer surface of the pressure controlled environment and to resist a pressure differential that urges portions of the sealing membrane through the hole.

11. The system for detecting and sealing the leak according to claim 1, wherein
the sealing membrane further comprises a reinforcement material that reinforces the sealing membrane.

12. A system for detecting and sealing a leak in a pressure controlled transportation system comprising a pressure controlled environment having a wall with an outer and an inner surface and an interior, and a hole passing through the wall that defines the leak in the pressure controlled transportation system, the system comprising:
at least two sensors provided within the interior of the pressure controlled environment that are structured and arranged to detect the leak;
a controller in communication with the at least two sensors;
a membrane deployer in communication with the controller; and
a sealing membrane deployable by the membrane deployer and structured and arranged to provide a pressure-tight seal over the hole on the outer surface of the wall to seal the leak, wherein
the sealing membrane comprises at least one gauge operable to measure at least one characteristic associated with the sealing membrane and operable to communicate the characteristic to the controller.

13. The system for detecting and sealing the leak according to claim 1, wherein
the at least one sensor is at least one of a microphone and a pressure gauge.

14. A method for detecting an approximate position of a leak in a pressure controlled transportation system comprising a pressure controlled environment having a wall with an outer and an inner surface and an interior, and a hole passing through the wall that defines the leak in the pressure controlled transportation system, at least a first and a second sensor arranged at respective positions a predetermined distance apart within the interior of the pressure controlled environment, and a controller in communication with the first and second sensor, the method comprising:
communicating the positions of the first and second sensors within the interior of the pressure controlled environment to the controller;
measuring, with the first sensor, a characteristic associated with a first leading shockwave emanating from the hole;
measuring, with the second sensor, a characteristic associated with a second leading shockwave emanating from the hole; and
calculating, using the controller, an approximate position of the hole in the pressure controlled environment based upon the positions of the first and second sensors, the characteristic associated with the first leading shockwave, and the characteristic associated with the second leading shockwave.

15. The method for detecting the approximate position of the leak according to claim 14, wherein
the characteristic associated with the first leading shockwave comprises a time that the first leading shockwave is detected by the first sensor, and
the characteristic associated with the second leading shockwave comprises a time that the second leading shockwave is detected by the second sensor.

16. The method for detecting the approximate position of the leak according to claim 14, wherein
the characteristic associated with the first leading shockwave comprises an amplitude of the first leading shockwave, and the characteristic associated with the second leading shockwave comprises an amplitude of the second leading shockwave.

17. The method for detecting the approximate position of the leak according to claim 15, wherein
the first and second sensors are microphones.

18. The method for detecting the approximate position of the leak according to claim 16, wherein
the first and second sensors are pressure gauges.

19. The method for detecting the approximate position of the leak according to claim 15, wherein
the first sensor is a sensor that first detects the shockwave.

20. The method for detecting the approximate position of the leak according to claim 15, wherein
the second sensor is a sensor that detects the shockwave after a first sensor.

21. A method for detecting and sealing a leak in a pressure controlled transportation system comprising a pressure controlled environment having a wall with an outer and an inner surface, and an interior, a hole passing through the wall that defines the leak in the pressure controlled transportation system, at least a first and a second sensor arranged at respective positions a predetermined distance apart within the interior of the pressure controlled environment, a controller in communication with the first and second sensor, an aerial vehicle in communication with the controller, and a sealing membrane deployable by the aerial vehicle and structured and arranged to provide a pressure-tight seal over the hole on the outer surface of the wall to seal the leak, the method comprising:

communicating the positions of the first and second sensors within the interior of the pressure controlled environment to the controller;

measuring, with the first sensor, a characteristic associated with a first leading shockwave emanating from the hole;

measuring, with the second sensor, a characteristic associated with a second leading shockwave emanating from the hole;

calculating, using the controller, an approximate position of the hole in the pressure controlled environment based upon the positions of the first and second sensors, the characteristic associated with the first leading shockwave, and the characteristic associated with the second leading shockwave;

instructing, using the controller, the aerial vehicle to transport the sealing membrane to the approximate position of the hole; and deploying the sealing membrane from the aerial vehicle to seal the leak.

22. The method for detecting and sealing a leak in accordance with claim 21, further comprising:

adhering the sealing membrane to the outer surface of the pressure controlled environment with an adhesive to resist a pressure differential that urges portions of the sealing membrane through the hole.

* * * * *